Patented Nov. 21, 1939

2,180,981

UNITED STATES PATENT OFFICE 2,180,981

PROCESS OF MAKING PHENOL-ALDEHYDE RESINS

Edmond F. Fiedler, Adams, Mass., assignor to General Electric Company, a corporation of New York No Drawing. Application June 25, 1937, Serial No. 150,376

5 Claims. (Cl. 260—57)

This invention relates broadly to a process of making synthetic resins. More particularly it relates to, and has as a principal object to provide certain improvements and modifications in processes of making permanently fusible acid-catalyzed phenol-aldehyde resins.

Phenol-aldehyde resins heretofore have been prepared by reacting the component materials under reflux in the presence of an acid catalyst and then dehydrating the reaction product under atmospheric pressure at a temperature of about 130° to 160° C. More recently such reaction products have been dehydrated under vacuum, thereby lowering the maximum temperature attained during dehydration and effecting an improvement in the properties of the end-product. In vacuum dehydrating an acid-catalyzed phenol-aldehyde condensation product, manufacturing difficulties are encountered which are not common to processes wherein such product is dehydrated at atmospheric pressure. For example, when dehydrating such resinous condensation product at, for example, 4 to 23 inches mercury pressure, the viscosity of the material gradually increases, so that before it has been completely dehydrated its vicosity is so high that the composition will flow from the kettle only very slowly. This is objectionable in that it limits the production capacity of the equipment and thus increases production costs. If the acid is neutralized immediately after the initial addition and condensation reaction has been completed, and the resin then is dehydrated under reduced pressure, no such difficulty in removing the resin from the reaction vessel is encountered. The resultant resin, however, is of a type intermediary between a permanently fusible and a potentially reactive resin. Such a resin is not entirely satisfactory for practical applications because of lack of uniformity between different batches, poor plasticity and finish, and slower curing rate. In certain cases too, particularly with cresol-formaldehyde resins which are very sensitive to variations in reaction temperatures, objectionable spots probably caused by gelled particles in the resin often occur in molding compound made from such resin.

In accordance with the present invention, the acid is neutralized at a particular point in the vacuum-dehydration process, that is, after a certain degree of polymerization or resinification has occurred. I have found that the degree of resinification which I desire to take place in the kettle, and the stage at which neutralization should be effected to avoid the difficulties previously mentioned, most conveniently may be determined by measuring the distillate water resulting from condensing the evolved water vapor.

In practicing this invention a neutralizing agent, such, for example, as lime, in an amount at least sufficient to neutralize the acidity of the phenol-aldehyde condensation product is incorporated with said product after a predetermined amount of water has been removed therefrom. In manufacturing, for example, an acid-catalyzed phenol- or cresol-formaldehyde resin I have found that the reaction may be retarded, and a resin of minimum viscosity and of permanent fusibility may be obtained by adding the neutralizing agent when from about 79 to 87 per cent of the total water initially added and formed by reaction of the main components has been removed by vacuum distillation. With marked variations in raw materials it may be necessary to vary somewhat the point of dehydration at which the lime or other neutralizing agent should be added in order to obtain permanently fusible resins having approximately the same physical characteristics. However, with like reactants and operating procedures the point in the dehydration process at which the neutralizing agent should be added, in order to procure results such as herein set forth, is quite constant.

Expressing in somewhat different terminology means by which the present invention may be carried into effect, it may be stated that in accordance with this invention the phenol-aldehyde condensation product is neutralized after having been dehydrated to a predetermined flow-point. For example, in the case of a phenol-formaldehyde condensation product, the resinous mass is neutralized when dehydration of the same has proceeded to a point where it has a flow-point of about 60° to 70° C. as determined by methods in common use in the art. At such flow-point the material will have a viscosity (MacMichael viscosimeter) at 100° C. of about 1500 to 3000 centipoises. A partly dehydrated cresol-formaldehyde condensation product when similarly neutralized will have a flow-point of about 75° to 90° C. Viscosity measurements at 100° C. of such a cresol resin are not practical, since even at the lower flow-point (75° C.) such material has a viscosity (MacMichael viscosimeter) of over 7000 centipoises.

I have found that the earlier during the vacuum-dehydration process at which the acid is neutralized, the lower is the viscosity of the practically completely dehydrated resin. However, if the reaction is retarded by adding neutralizing agent before about 79 per cent water has been removed, the practically completely dehydrated phenol-aldehyde resinous composition is not permanently fusible but instead is of a type which slowly cures. On the other hand, if the neutralizing agent is added after more than about 87 per cent of water has been removed, a practically completely dehydrated phenolic resin of objectionably high viscosity results. With added delay, beyond 87 per cent water removed, in retarding the reaction by neutralization, finally a point is reached at which not sufficient water is present properly to react the neutralizing agent and acid. The resin gives an acid reaction. The vicosity of such a resin at times may be so high as to stop the stirrer of the kettle in which it is being made. In such condition the resin insulates the walls of the kettle, prevents heat transfer, and is extremely difficult to remove from the kettle in fluid state.

The viscosity and the flow-point of resinous compositions, formed by reacting a phenol and an aldehyde in the presence of an acid catalyst and then dehydrating the reaction product under substantial vacuum, may be varied not only by varying the point at which the partly dehydrated material is neutralized but, in addition thereto, by other changes in manufacturing technique. For example, if it be desired to obtain permanently fusible resins of lower viscosity (lower flow-point) than a particular formula and process provide, the time of reacting the components may be varied. If this does not result in a resin sufficiently low in viscosity, it may be necessary to reduce the acid concentration or to reduce the ratio of the aldehyde component to the phenolic component. If more viscous (higher flow-point) permanently fusible resins should be desired, the reverse procedure may be practised.

A more specific example illustrative of how this invention may be carried into effect follows:

Cresol _____ 1000 pounds
Aqueous formaldehyde (37½%) _____ 690 pounds
Sulfuric acid (specific gravity 1.63)
  in 160 pounds water _____ 6.73 pounds
Hydrated lime in 40 pounds
  water _____ 7 pounds, 7½ ounces Stir and react the cresol and formaldehyde under reflux in the presence of the sulfuric acid for about 45 minutes to one hour. The reaction is carried out at a temperature of about 94° to 100° C. Vacuum dehydrate until about 83 per cent of the water present therein has been removed. The total water is calculated by taking into consideration the water present in the aqueous formaldehyde and in the sulfuric acid, and the water formed during the reaction of the cresol and the formaldehyde. Dehydrating to this point may take, for example, from about 1½ to 4 hours, depending upon the temperature and pressure employed, cleanliness of the kettle, and other influencing variables. Immediately after about 83 per cent of the water has been removed, add the hydrated lime dispersed in water. Then dehydrate until substantially all the remaining water has been removed from the resin, that is, until the resin is practically free from water, bringing the temperature to about 105° C. The final dehydration may take, for example, from about 1¾ to 4 hours, depending upon such variables as previously mentioned. It is more difficult to remove the last part of the water than the first.

During the dehydration process a reduced pressure of, for example, from about 4 to 23 inches of mercury (a vacuum of about 7 to 26 inches of mercury) may be employed, as desired or as may be required. Vacuum is applied slowly at first to avoid excessive entrainment of resin with the water vapor, after which it is brought to such point as will give maximum speed of dehydration consistent with efficient and economical operation. Preferably dehydration is effected under conditions whereby the resin is maintained at a temperature above about 80° C. Hence if, during dehydration, the temperature drops, for example to about 75° to 78° C., steam is turned into the jacket of the kettle to maintain the preferred temperature and to keep the mass boiling. Use of a vacuum which would materially reduce the temperature of the resin, that is to a temperature of the order of 45° to 50° C., preferably is avoided, since at such temperature the resin tends to insulate the walls of the kettle and thereby decreases considerably the transfer of heat from the jacket to the resin mass.

The resin produced in accordance with the described procedure is of the permanently fusible type. It has a medium viscosity and may be withdrawn from the reaction vessel without difficulty. After removing the material from the kettle it is cooled. When it has solidified, it is ground and blended with the usual components of molding resins, for example with hexamethylenetetramine, lime and lubricant.

Of course, it is to be understood that this invention is not limited to processes involving resins formed by reacting phenol or cresol with formaldehyde in the presence of an acid catalyst such as sulfuric acid, but that any and all permanently fusible resins of the vacuum-dehydrated acid-catalyzed, phenol-aldehyde type may be made in accordance with the present invention. Likewise, alkaline substances other than hydrated lime may be employed as neutralizing agents, for example, sodium carbonate or sodium hydroxide, preferably in solution state. Hydrated lime dispersed in water, however, is the preferred neutralizing agent.

Permanently fusible phenol-aldehyde resins produced in accordance with the present invention have a flow point of about 85° to 100° C.

What I claim as new and desire to secure by Letters Patent of the United States is:

1. The method of making a permanently fusible phenol-aldehyde resin which comprises reacting a phenol and an aldehyde in the presence of an acid catalyst, partly dehydrating the reaction product under reduced pressure until it has a flow point of about 60° to 90° C., neutralizing the said partly dehydrated product, and dehydrating the neutralized product under reduced pressure until substantially all the remaining water has been removed.

2. The method of making a permanently fusible phenol-formaldehyde resin which comprises reacting a phenol and an aqueous solution of formaldehyde in the presence of a small amount of sulfuric acid as a catalyst for the reaction, dehydrating the reaction product under reduced pressure until from about 79 to 87 percent of the total water present therein has been removed, immediately thereafter adding to the partly dehydrated product an aqueous dispersion of calcium hydroxide in an amount at least sufficient to neutralize the acidity of the reaction product, and practically completely dehydrating said neutralized product under reduced pressure.

3. The method of making a permanently fusible phenol-aldehyde resin which comprises reacting a phenol and an aqueous solution of aldehyde in the presence of an acid catalyst, partly dehydrating the reaction product under reduced pressure until it has a flow-point of about 60° to 90° C., neutralizing said partly dehydrated product, and dehydrating the neutralized product under reduced pressure until practically free from water.

4. The method which comprises the steps of reacting cresol and an aqueous solution of formaldehyde in the presence of an acid catalyst and retarding the reaction between said components, while dehydrating the reaction mixture under reduced pressure, by incorporating an aqueous dispersion of calcium hydroxide with the partly dehydrated product when the latter has a flow-point of about 75° to 90° C.

5. The method of making a permanently fusible phenol-aldehyde resin which comprises reacting a phenol and an aqueous solution of an aldehyde in the presence of an acid catalyst, dehydrating the reaction product under reduced pressure until from about 79 to 87 per cent of the total water present therein has been removed, adding to the partly dehydrated product when the said amount of water has been removed an alkaline substance in an amount at least sufficient to neutralize the said reaction product, and dehydrating the resulting product under reduced pressure until substantially all the remaining water has been removed.

EDMOND F. FIEDLER.